United States Patent [19]

Urbish et al.

[11] Patent Number: 5,761,093
[45] Date of Patent: Jun. 2, 1998

[54] QUALITY FORECASTING ENGINE

[75] Inventors: Glenn F. Urbish, Coral Springs; William Boone Mullen, III, Boca Raton; Scott G. Potter, Coconut Creek, all of Fla.

[73] Assignee: Motorola, Inc., Schaumburg, Ill.

[21] Appl. No.: 854,130

[22] Filed: May 8, 1997

[51] Int. Cl.⁶ ............................................... G06F 17/60
[52] U.S. Cl. ............. 364/552; 364/551.01; 364/468.14; 364/468.17
[58] Field of Search ............... 364/550, 551.01, 364/552, 554, 555, 468.01, 468.02, 468.03, 468.1–468.14, 468.16, 468.17, 488–491

[56] References Cited

U.S. PATENT DOCUMENTS

| | | | |
|---|---|---|---|
| 5,239,487 | 8/1993 | Horejsi et al. | 364/552 |
| 5,452,218 | 9/1995 | Tucker et al. | 364/468 |
| 5,539,652 | 7/1996 | Tegethoff | 364/490 |
| 5,715,181 | 2/1998 | Horst | 364/554 |

*Primary Examiner*—James P. Trammell
*Attorney, Agent, or Firm*—Dale W. Dorinski

[57] ABSTRACT

An automated method of predicting the number of defects that will occur during the manufacturing of a new electronic assembly design on a specific assembly line. Defective components are counted (214) as they are manufactured on an assembly line (210). The counted defects are stored in a historical database (220) and the defect rate is calculated. A bill of material for the new electronic design (230) is enumerated and information associated with each component is extracted from a library database (240) into a quality forecasting engine (250). The quality forecasting engine imports the enumerated bill of material and imports the stored defect rate from the historical database to perform a calculation of a predicted number of defects (260) for said new electronic assembly using the extracted library information.

8 Claims, 3 Drawing Sheets

QUALITY FORECASTING ENGINE

TECHNICAL FIELD

This invention relates to a method of predicting the overall quality level of a new electronic assembly.

BACKGROUND

One step in the design of a new electronic product is the selection of electronic components, such as resistors, capacitors, switches, microprocessors, memory devices, transistors, filters, etc. The designer typically has a multiplicity of choices for each of these components, both in electrical specifications and in physical size and form. For example, a single value of a resistor can be supplied in leaded or leadless form, and the leadless form can be in several sizes and shapes (round, cubic, rectangular). After selecting the components, the designer then lays them out on a printed circuit board (PCB) and routes the electrical connections on the board according to the schematic circuit. Depending on the complexity of the design, the circuit board may be a single layer of electrical connections, or as many as 8–10 layers stacked one upon the other. During this selection, design and layout process, it would be desirable for the designer to have some information as to the relative degree of difficulty of manufacturing the assembly, in order to optimize the design.

Until now, designers have relied upon information from the component manufacturer and upon their own experience when selecting components. Obviously, the skill level of the person or persons doing the design has a large influence on the quality of the final design. This often results in electronic products that can be very difficult to manufacture and that have a large number of manufacturing defects in the finished product. In order to be cost competitive, one must design a product so that it can be made with an absolute minimum number of manufacturing defects. Traditionally, engineers have attempted to reduce defects by optimizing the production assembly line so that it would be 'forgiving' of hard to manufacture designs. However, the continuing quest for size reduction forces designs to be more and more compact, thus making them more difficult to manufacture, even with the best assembly lines. In addition, even when a 'proper' design is made, the designer would like to have some indication as to the level of quality (i.e. the number of manufacturing defects) of the finished product, prior to actually manufacturing the product. Manual estimation of new product quality levels have been done to a limited extent, however these were completely manual efforts, and because they are very time consuming and have limited accuracy, have had very limited use. It would be desirous if one could devise a method whereby even a novice designer could create a design that would have a minimum number of potential defects and if such a method could provide detailed knowledge into the quality impact of each component.

DETAILED DESCRIPTION OF THE PREFERRED EMBODIMENT

Prior to the development of our quality forecasting (QF) engine, quality predictions for new designs were done manually, which was extremely time consuming and inaccurate since it used "standard" industry averages as a benchmark component quality rate, and thus, manual prediction of new design quality has been virtually ignored by product development teams. Our quality forecasting engine provides a fully automated method to predict manufacturing quality levels for new designs before the first prototype is ever fabricated. The cycle time to make a quality prediction for a new design is only a few minutes. In addition to being rapid, our quality predictions are extremely accurate, as verified on existing designs currently built on an assembly line. The quality data used to make predictions is calculated from actual historical defect data as accumulated in various factories, not "standard" industry averages, and is continually updated to reflect any process improvements in the factory. The engine provides the product development team with highly accurate real-time feedback on the manufacturing quality for a new design early in the development cycle at the PCB layout stage. This accurate and early feedback enables the development team to address quality related design issues, before a significant commitment has been made. The result is that proactive design changes reduce the overall product development cycle time, while improving the manufacturing quality of the product. In one instance, these changes resulted in a 31% improvement in projected manufacturing quality.

Figure 1:
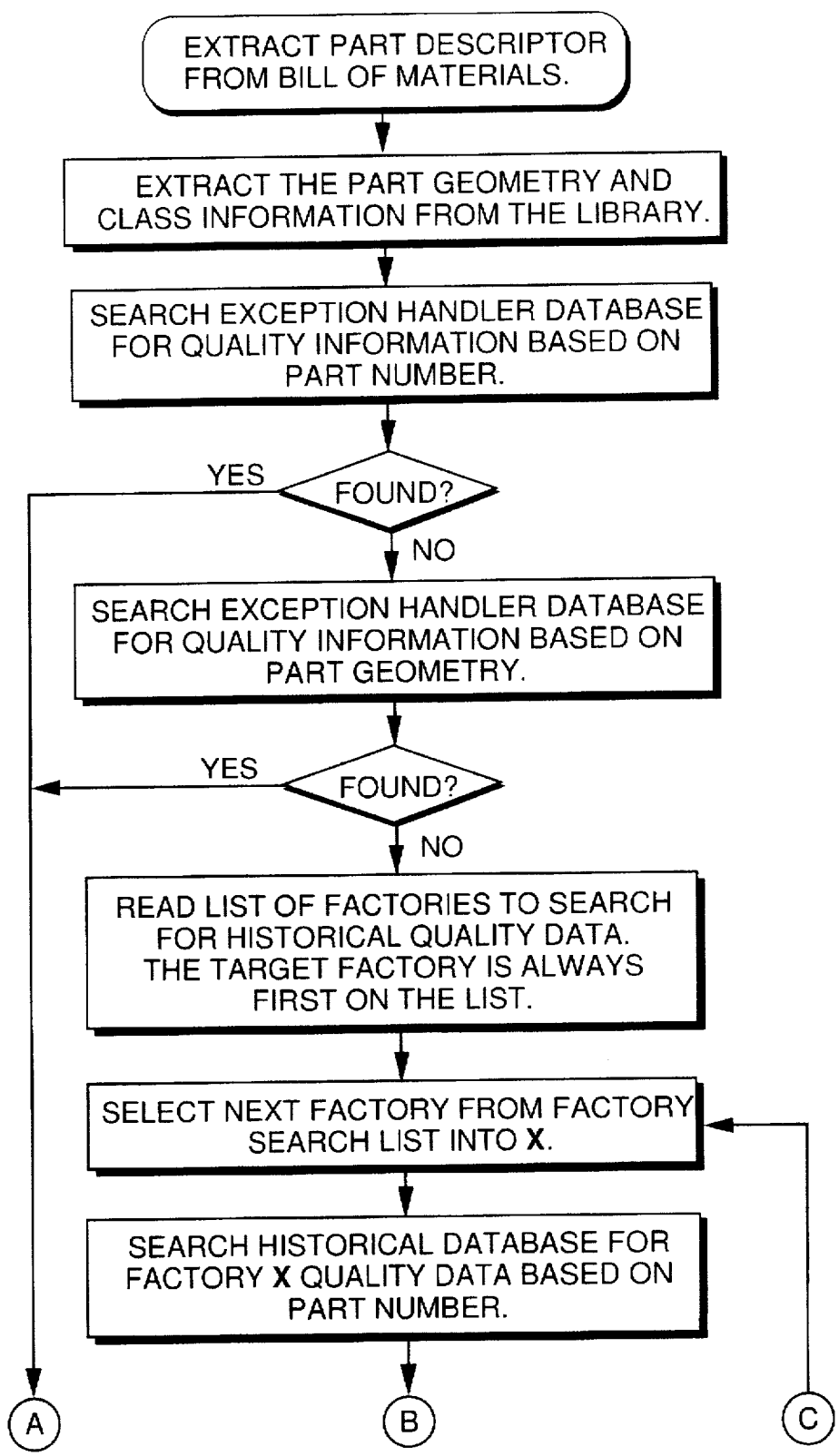
FIGS. 1 and 2 depict a flow chart for a data extraction algorithm in accordance with the invention.
Figure 2:
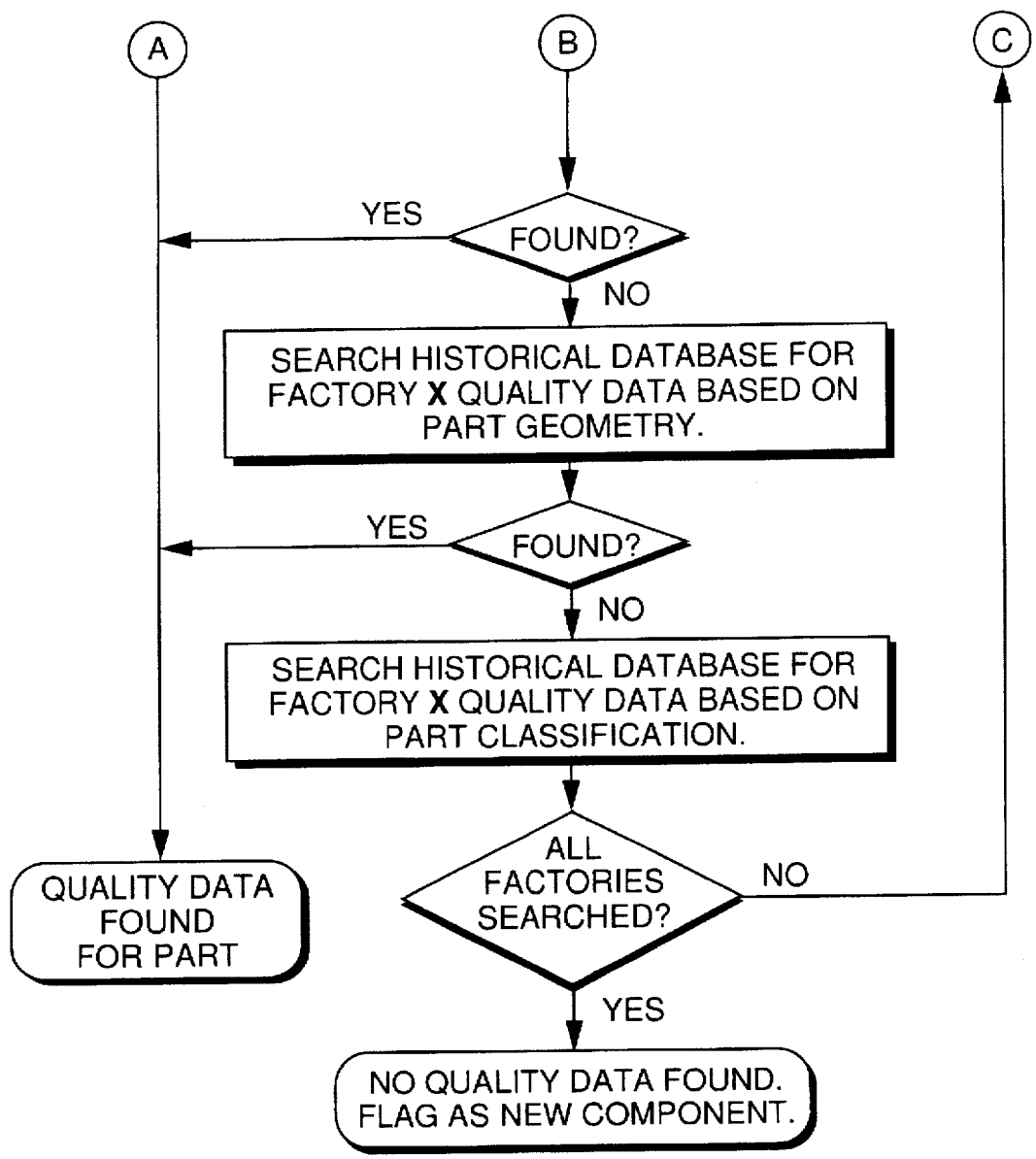
Figure 3:
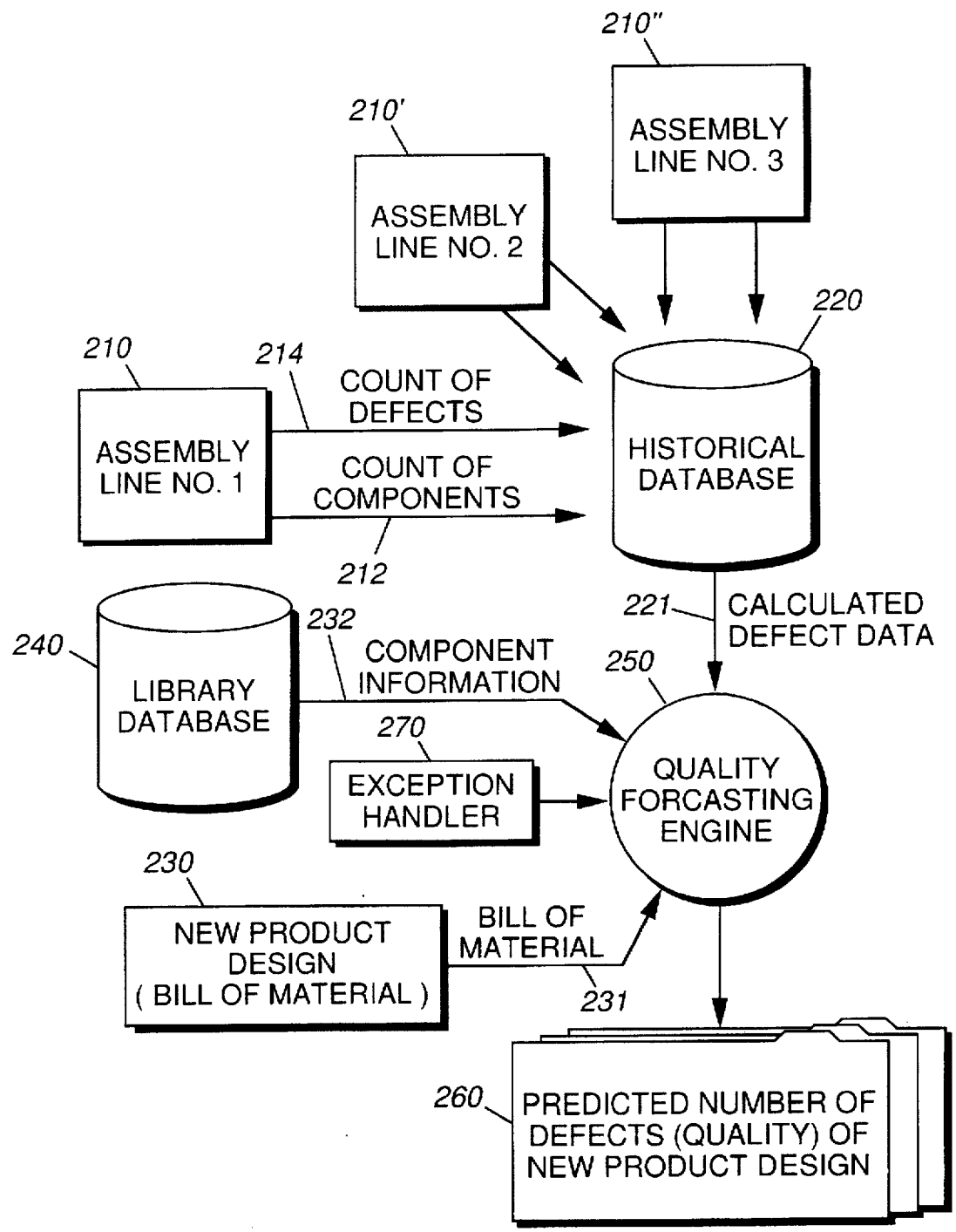
FIG. 3 is a flow chart of the method of predicting the number of defects in accordance with the invention.

The quality forecasting method includes the process of extracting and zone refining raw quality data to provide direction to the component selection process for the product engineer. The QF engine uses factory defect data from existing products that are built on a specific assembly line as the basis for making all new product design quality predictions. It can also provide information as to the relative quality capability of various assembly lines, and compare one line to another. Referring now to FIG. 3, a high level overview of the process used to collect factory quality data and utilize it for new product quality predictions is shown. When existing products (i.e. electronic assemblies) are being built on the assembly line 210, each component in the electronic assembly is counted and identified 212 during a finite time period, typically each day. In the preferred embodiment, all components on each and every assembly are measured, however, one could also measure a subset of the available products, but this may degrade the data somewhat, especially at very low defect levels. Any defects in the electronic assembly that are identified 214 during the testing regimen are then associated with one or more individual components to provide historical quality data. A software algorithm automatically collects and extracts the most accurate historical quality data for use in predicting defect levels of components and stores it in a historical database 220. A more detailed view of the process for this data extraction algorithm is shown in FIGS. 1 and 2. This process is followed for each component in the New Design bill of materials. At each step where quality data is extracted from the historical quality database, the statistical significance of the defect value is calculated before committing to the component quality rate. This insures that the final quality prediction is statistically valid.

The QF method extracts raw data from the historical database, to calculate component quality levels for every part that is being used in the factory or assembly line. A software algorithm then recalculates each component's quality level abstracted to a higher level such as the geometry of the part (e.g. physical size), and part classification levels (i.e. resistor, capacitor, transistor, etc.). For each calculation, statistical confidence intervals for the quality values are calculated using a binomial distribution. The software uses information from the standard component library database 240 to associate a component geometry description with each unique part number. This library information is critical in categorizing similar components during quality level calculation and in the quality matching algorithms used when processing a new product design.

The QF engine 250 imports the Bill of Material (BOM) file 231 for the New Design 230 and correlates part number data with the library database to extract geometry and classification information. This input format requires no post processing of the New Design file, as the information is preferably reformatted prior to arriving at the QF engine 250. All component information 232 from the library database is transferred to the QF engine 250, which then processes each component in the New Design BOM to extract 221 the appropriate quality data from the historical database 220. A component quality matching algorithm can make quality predictions for new variations of existing components. The matching algorithm that is used first attempts to find existing quality information for the same part number. If it is not found, then the QF engine can search for the desired information from other assembly lines 210' 210". Alternatively, if no match is found the component can be abstracted up to the next (geometry) level and an attempt made to again find existing quality information first from the desired historical database 220. If it is not found, then the engine will search alternate databases 220' from other assembly lines for the desired information. If no match is found, then a final search is made with the component abstracted up to the class level. If no match is found at this point, the component is flagged as a component with an unknown quality risk, and an exception handler 270 may be invoked to manually enter a value for the defect rate.

All information from the quality prediction 260 for a New Design is written to a quality report file. The report consists of three sections. First, the report contains an overall design quality summary which include the defects per unit, the quality level, number of parts in the New Design, and the number of opportunities for defects in the New Design. The second section of the report contains a detailed Pareto defect report for the design. The Pareto report may include the defects per unit, the quality level, number of parts in the New Design, etc. for each component category in the design. The final section of the quality report consists of a quality prediction for each component in the New Design which includes a reference designator, part number, the part geometry (i.e. 'footprint'), class, defect impact, quality level, upper and lower statistical confidence intervals, defect impact due to material defects, and defect impact due to factory process defects.

The quality forecasting engine was developed in the ProC language to provide a seamless connection to other databases. The QF engine was written in discrete modules such that the quality level calculation program can be run independently of the actual quality forecasting section. The component quality level calculation program is run automatically during non-production hours so that the processing intensive algorithms have minimal impact on the assembly line databases during production hours. The QF engine is a stand alone software program independent of the user interface, such that the user interface can be added on top of the engine rather than integrated into it. The QF engine has fully functional user interfaces from both the UNIX command line and via an interactive web page interface.

The method of correlating a New Design bill of materials with historical component factory performance levels is fully automated. The quality calculations are always first performed at a part number level, the most unique level available, if possible. The tiered component matching algorithm allows new components to be automatically abstracted to a higher level (part number level to geometry level or to classification level) in order to provide the best possible quality estimation for new components. The component quality performance data is calculated based on a three month rolling average, based on part number, footprint, and class. A standardized component library is used so that the QF engine is a generic tool that is usable by many different designers. A component quality override file provides for exception handling of new components that are not resident in any of the libraries or databases.

In summary, our invention provides fully automated links to the factory performance data, with a seamless link to the New Design PCB data, and requires minimal user interaction to generate a quality forecast report. The quality forecasting engine can thus be applied to any new PCB/product design to provide real time quality feedback to the product development team. It decreases the time required to make a prediction of the quality level of a new design, increases the accuracy of the prediction, uses actual factory performance levels for the quality predictions, and automatically makes a quality estimate for new variations of existing components.

While the preferred embodiments of the invention have been illustrated and described, it will be clear that the invention is not so limited, and other equivalents will occur to those skilled in the art without departing from the spirit and scope of the present invention as defined by the appended claims.

What is claimed is:

1. An automated method of predicting the number of defects that will occur during the manufacturing of a new product design on a specific assembly, line, comprising:

identifying and counting the components that are manufactured on said assembly line during a time period;

counting the number of defects that are associated with each of said identified components;

storing the counted defects in a first historical database;

calculating the defect rate for each of said identified components and storing said defect rate in the first historical database;

enumerating a bill of material for said new electronic assembly design;

extracting information associated with a component from a library database into a quality forecasting engine, said information comprising part number, part description and part geometry;

the quality forecasting engine importing the enumerated bill of material and the stored defect rate from the first historical database; and the quality forecasting engine performing a comparison of the imported enumerated bill of material information to the extracted information and to the imported stored defect rate, and calculating a predicted number of defects for said new electronic assembly.

2. The method as described in claim 1, further comprising an exception handler step, prior to the final step, wherein factors for components that are not resident in the first historical database or in the library database are input into the quality forecasting engine.

3. The method as described in claim 1, wherein the step of calculating a predicted number of defects comprises calculating a predicted number of defects for every component in the bill of material.

4. The method as described in claim 1, wherein the step of extracting and the step of importing comprises reformatting said information and said defect rate.

5. The method as described in claim 1, wherein said enumerated bill of material contains a listing of every component in said new electronic assembly design.

6. The method as described in claim 1, wherein if a component in said new electronic assembly design can not be compared with a stored defect rate for an equivalent component resident in said first historical database, then a stored defect rate from an equivalent component in a second historical database is imported into the quality forecasting engine.

7. An automated method of predicting the number of defects that will occur during the manufacturing of a new electronic assembly design on a specific assembly line, comprising:

identifying and counting the components that are manufactured on said assembly line during a time period;

counting the number of defects that are associated with each of said identified components;

storing the counted defects in a first historical database;

calculating the defect rate for each of said identified components and storing said defect rate in the first historical database;

enumerating a bill of material for every component in said new electronic assembly design;

extracting information associated with a component from a library database into a quality forecasting engine, said information comprising part number, part description and part geometry;

the quality forecasting engine importing the enumerated bill of material and the stored defect rate from the first historical database;

inputting into the quality forecasting engine factors for components that are not resident in the first historical database or in the library database; and the quality forecasting engine performing a comparison of the imported enumerated bill of material information to the extracted information and to the imported stored defect rate, and calculating a predicted number of defects for every component in the bill of material of said new electronic assembly.

8. The method as described in claim 7, wherein if a component in said new electronic assembly design can not be compared with a stored defect rate for an equivalent component resident in said first historical database, then a stored defect rate from an equivalent component in a second historical database is imported into the quality forecasting engine.

* * * * *